United States Patent Office 3,062,784
Patented Nov. 6, 1962

1

3,062,784
ORGANIC POLYMERIC STRUCTURES AND
PROCESS THEREFOR
Stanley Tocker, Wilmington, Del., assignor to E. I. du Pont de Nemours and Company, Wilmington, Del., a corporation of Delaware
No Drawing. Filed Apr. 7, 1959, Ser. No. 804,600
20 Claims. (Cl. 260—62)

This invention relates to organic polymeric structures and particularly to polymeric films suitable for outdoor use.

Many organic polymeric structures, such as structures of polyethylene, polypropylene and the like, i.e., polymers of aliphatic alpha-olefins, deteriorate rapidly when subjected to sunlight. The materials are sensitive to light in the ultraviolet range, particularly in the wavelength range of 2900–3800 A. The ultraviolet rays tend to embrittle the structures and reduce the level of their electrical and physical properties substantially. Some polymers acquire an undesirable color upon exposure.

The use of certain chemical compounds as ultraviolet absorbers in mechanical mixture with the polymers is known. Thus, compounds such as benzophenones or salicylic acid esters have been incorporated into the molten polymer prior to forming a structure or they have been coated on the surface of the polymeric structure. In either case, the protection afforded by these compounds is not permanent. The compounds gradually disappear from the polymeric structure due to their volatility.

The object of the present invention is to provide a substantially permanent weather-resistant organic polymeric shaped structure, particularly films, suitable for outdoor use. It is a further object to provide a process for incorporating ultraviolet absorbent compounds into the polymeric structures so that the compounds are firmly attached to the structure. Other objects will appear hereinafter.

The objects are accomplished by copolymerizing 90–99.99 mole percent of at least one aliphatic alpha-olefin having the structural formula:

$$H_2C=C-R$$
$$\phantom{H_2C=C-}H$$

wherein R is selected from the group consisting of hydrogen and alkyl having 1–4 carbon atoms, with .01–10 mole percent of at least one allyl compound selected from the group consisting of

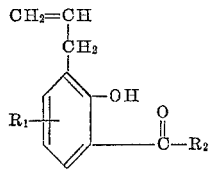

and

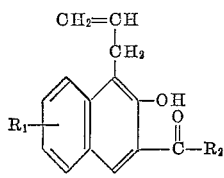

2 wherein $R_1$ is selected from the group consisting of hydrogen, halogen, alkyl, alkoxy, carboalkoxy and acyl, and $R_2$ is selected from the group consisting of alkyl, alkoxy and

PREPARATION OF ALLYL COMPOUNDS

The allyl compound, which may be allyl aromatic ketones, allyl alkyl aryl ketones and allyl orthohydroxy aromatic acid esters, may be synthesized from the corresponding allyl aryl ethers by the reaction known as the Claisen rearrangement (Claisen and Eisleb, Annalen der Chemie, 401, 36 (1943)). The preparation of representative allyl compounds is provided in the subsequent examples.

Some of the allyl monomeric compounds useful in preparing the polymers of the present invention include 3-allyl-2-hydroxybenzophenone, 3-allyl-2-hydroxyacetophenone, 4-methoxy-3-allyl-2-hydroxybenzophenone, 5-allyl-2-hydroxybenzophenone, 5-allyl-2-hydroxyacetophenone, 3-allyl-2-hydroxy-4-methoxyacetophenone, 3-allyl-2-hydroxy-4-chlorobenzophenone, 3-allyl-2-hydroxy-5-chlorobenzophenone, 3-allyl-2,2'-dihydroxybenzophenone, 3-allyl-2,2'-dihydroxy-4-methoxybenzophenone, 3-allyl-2,2'-dihydroxy-4,4'-dimethoxybenzophenone, 3-allyl-2-hydroxy-5-acetylbenzophenone, 3-allyl-2-hydroxy-5-carbomethoxybenzophenone, ethyl 1-allyl-2-hydroxy-3-naphthoate, and methyl 3-allylsalicylate.

COPOLYMERIZATION OF THE ALLYL COMPOUNDS WITH THE OLEFINS

The process for preparing the polymers involves subjecting the monomers, preferably in a liquid hydrocarbon or halogenated hydrocarbon such as hexane, benzene, toluene, tetrachloroethylene, etc., to a temperature of −40° to 300° C. and a pressure of 1–1000 atmospheres in the presence of a "coordination catalyst" and isolating the resulting polymer. When high pressures are used, 1000 atmospheres and above, a conventional peroxide or azo catalyst instead of the coordination catalyst may be used.

A "coordination catalyst" may be defined in its broadest sense as one formed by the reaction of a reducible polyvalent metal compound with an amount of a reducing agent sufficient to reduce the valence of the metal component to 2 or less. Specifically, such a catalyst is composed of:

(A) A compound containing at least one metal of the group consisting of metals of groups IVa, Va and VIa of the periodic table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of groups I, II and III of the periodic table, said metal being above hydrogen in the electromotive series, attached directly through a single bond to a carbon atom, said carbon atom selected from the group consisting of trigonal carbon and tetrahedral carbon.

In the above definitions, periodic table means Mendeleeff's Periodic Table of the Elements, 25th ed., Handbook of Chemistry and Physics, published by the Chemical Rubber Publishing Co.

Ordinarily, catalytic amounts of the components of the catalyst system may be used in the present invention. Thus, component (A) may comprise 0.01–20 millimoles or higher, preferably 0.2–20 millimoles, per liter of solvent plus monomers. The mole ratio of component (B)-to-component (A) in the catalyst system should be at least 1:1, preferably 1:1 to 100:1.

Component (A) in the catalyst system has been defined as a compound containing at least one metal selected from the group consisting of metals of groups IV$a$, V$a$ and VI$a$ of the periodic table, iron, cobalt, copper, nickel and manganese, having directly attached to it a halogen atom, oxygen atom, hydrocarbon or —O-hydrocarbon group. Typical group IV$a$ metals are titanium, zirconium and hafnium; group V$a$ metals, vanadium, columbium and tantalum; group VI$a$ metals, chromium, molybdenum and tungsten. Specific examples of the compounds included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl, zirconate, tetra(chloroethyl)zirconate, and the like.

Component (B) in the catalyst system has been defined as a reducing compound selected from the group consisting of metal hydrides and compounds having a metal of groups I, II and III of the periodic table above hydrogen in the electromotive series, attached directly through a single bond to a trigonal or tetrahedral carbon atom. A trigonal carbon atom is a carbon atom having two single bonds and a double bond

Groups which may be attached to a metal, which metal is attached to a trigonal carbon atom, are aryl groups or arylalkyl groups. By tetrahedral carbon atom is meant a carbon atom having four single bonds

Groups which may be attached to a metal, which metal is attached to a tetrahedral carbon atom, are alkyl groups, aryl groups, alkylaryl groups and alkenyl groups. Specific examples of useful reducing agents included in this definition are phenyl magnesium bromide, lithium aluminum tetraalkyl, aluminum trialkyl, dimethyl cadmium, diphenyl tin, and the like.

Useful combinations of component (A) and component (B) compounds for use as catalyst systems in the invention include the following:

Vanadyl dichloride (VOCl$_2$) plus aluminum diisobutyl butoxide
Vanadyl trichloride (VOCl$_3$) plus aluminum triisobutyl
Vanadyl trichloride (VOCl$_3$) plus aluminum hydride (AlH$_3$)
Vanadyl trichloride (VOCl$_3$) plus lithium butyl
Vanadium dichloride (VCl$_2$) plus aluminum triisobutyl
Vanadium trichloride (VCl$_3$) plus aluminum isobutyl dichloride
Vanadium tetrachloride (VCl$_4$) plus aluminum isobutyl dibutoxide
Vanadium tetrachloride (VCl$_4$) plus aluminum triisobutyl
Vanadium tetrachloride (VCl$_4$) plus aluminum hydride (AlH$_3$) 2-ethyl hexyl vanadate plus aluminum triisobutyl
Titanyl dichloride (TiOCl$_2$) plus aluminum isobutyl dichloride
Titanium tetrachloride (TiCl$_4$) plus ethyl magnesium bromide
Titanium tetrachloride (TiCl$_4$) plus aluminum triisobutyl
Titanium tetrachloride (TiCl$_4$) plus lithium aluminum tetraisobutyl
Titanium tetrachloride (TiCl$_4$) plus sodium naphthalene
Tetraisopropyl titanate Ti(OC$_3$H$_7$)$_4$ plus aluminum triisobutyl
Tetraisobutyl titanate Ti(OC$_4$H$_9$)$_4$ plus sodium naphthalene
Cobaltous chloride (CoCl$_2$) plus aluminum triisobutyl
Cobalt hexammonium chloride Co(NH$_3$)$_6$Cl$_2$ plus aluminum triisobutyl
Manganese bromide (MnBr$_2$) plus aluminum triisobutyl
Manganese bromide (MnBr$_2$) plus zinc diisobutyl
Chromium chloride (CrCl$_3$) plus aluminum triisobutyl
Cuprous chloride (Cu$_2$Cl$_2$) plus aluminum triisobutyl
Ferric bromide (FeBr$_3$) plus aluminum triisobutyl
Molybdenum chloride (MoCl$_5$) plus aluminum triisobutyl
Nickel chloride (NiCl$_2$) plus aluminum triisobutyl The success of the foregoing catalyst system for initiating and promoting the polymerization of the allyl compound with the defined olefinically unsaturated hydrocarbons is not completely understood. The exact composition of the "coordination catalyst" when it is in its active state, i.e., capable of initiating and promoting polymerization, is not known. However, it is believed that when one of the polyvalent metal compounds is mixed with a sufficient amount of an organometallic reducing agent to reduce the valence of the polyvalent metal, the polyvalent metal composition becomes a highly active polymerization catalyst. It is believed that in this highly active state, the polyvalent metal composition contributes substantially to the polymerization of the ethylenically unsaturated monomers which results in a high molecular weight, substantially linear polymer.

Polymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used.

The reaction conditions, temperature and pressure, at which polymerization is performed may be extremely mild. Temperatures of the reaction may range from −40° to 300° C. and pressures of 1 atmosphere to 1000 atmospheres may be used successfully. The optimum conditions of temperature and pressure are 0°–300° C. and not more than 500 atmospheres, respectively.

Polymerizable hydrocarbons containing terminal ethylenic unsaturation and suitable for copolymerization with the allyl compounds in the present invention include the preferred group of mono-olefins such as ethylene, propylene, buteene-1, pentene-1 and hexene-1. The resulting products are weather-resistant shaped structures such as films, filaments, tubing, rods and the like of these copolymers. However, if important structures of heptene-1, octene-1, decene-1, 3-methylbutene-1, 4-methylpentene-1 and 4,4-dimethylpentene-1 could be fabricated, they would be expected to react with the allyl compounds similarly to form structures unaffected by ultraviolet light. Also, the polyolefins having terminal ethylenic unsaturation, although not providing the very useful products of the aforementioned preferred group of mono-olefine, might also be suitable for copolymerization with the allyl compound. Such polyolefins include butadiene, isoprene (2- methyl-1,3-butadiene), 3-methyl-1,2-butadiene and 6-methyl-1,5-heptadiene.

The weather-resistant products—films, filaments, tubing, etc. are important primarily for outdoor uses. In greenhouses, exterior screening, automobile exteriors or garden hose and the like, these products will find wide application.

As an illustration of a method contemplated for carrying out the present invention, a catalyst system, e.g., vanadyl trichloride and aluminum triisobutyl, is mixed in the hydrocarbon solvent, e.g., n-hexane, under a blanket of nitrogen gas. Component (A), vanadyl trichloride, may be present to the extent of about 5 millimoles and component (B), aluminum triisobutyl, may be present to the extent of about 10 millimoles. After stirring for about ten minutes at a temperature of about 25° C., the nitrogen supply is cut off and a gas stream of ethylene and a solution of 3-allyl-2-hydroxybenzophenone in chlorobenzene is introduced simultaneously into the catalyst suspension. Alternatively, the monomers may be introduced first into the reaction vessel, followed by introduction of the catalyst. The order of adding catalyst and monomers is not critical to the present invention. After sufficient time, 2 to 3 hours, the reaction is complete and water, methanol, ethanol or a similar low molecular weight alcohol, is added to destroy the catalyst. The copolymer or terpolymer, (depending on the number of monomers used) is then isolated and purified in a manner known to those skilled in the art.

The ratio of the allyl compound-to-ethylene and/or other hydrocarbon monomer reacted should be such that the final polymer is composed of .01–10 mole percent allyl compound and 99.99–90 mole percent of the other hydrocarbon monomer or monomers. Less than .01 percent of the allyl compound does not provide adequate protection against ultraviolet light. More than 10 percent tends to affect adversely the physical properties of the basically polyethylene or polypropylene, etc. structure. It has been found that the reaction is very efficient so that a reaction mixture of about .01–10 mole percent allyl compound and about 99.99–90 mole percent of the remaining monomer or monomers usually will provide the desired polymer product.

The polymer product, in its preferred form (i.e., reaction product of the allyl compound and the alpha-olefin) is a substantially linear polymer having pendant groups of the formula

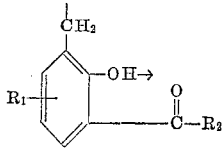

or

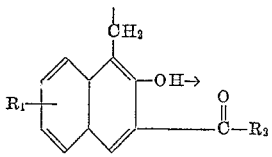

wherein $R_1$ and $R_2$ are as given in column 1 and → indicates chelation. The determination of the structure was accomplished by Infrared Spectral Techniques[1] known to those skilled in the art. The majority of the infrared spectra herein were taken on pressed films by the use of a Perkin-Elmer Model 21 Spectrophotometer and a Perkin-Elmer Infracord Spectrophotometer. The infrared scans showed absorption bands characteristic of carbonyl groups chelated with active hydrogen at 1650–1690 cm.$^{-1}$ and the complete absence of allyl groups.

Partial extraction of the polymeric materials with toluene showed no change in composition, which is further evidence that the allyl compound has undergone copolymerization with the alpha-olefin.

The invention will be more clearly understood by referring to the examples which follow, Example 1 representing the best mode contemplated for practicing the invention. It is understood that the examples, although illustrating specific embodiments of the present invention, should not be considered limitative.

In general, the examples include a description of the preparation of the allyl aryl ether, the rearrangement of the ether to the novel useful allyl compound and the polymerization with the aliphatic olefinic monomer. Criteria for etherification were (1) physical properties of the product and (2) a negative ferric chloride test[2] for the presence of unreacted phenolic groups.

The light stability test used in the examples was carried out by exposing the films to the action of a bank of Westinghouse sun lamps for the periods indicated.

*Example 1*

The following mixture was refluxed for 6.0 hours under anhydrous conditions and with thorough stirring: 30.0 g. (0.15 mole) of ortho-hydroxybenzophenone, 39 g. of acetone, 21.4 g. (0.18 mole) of allyl bromide and 21.4 g. (0.16 mole) of potassium carbonate. To the stirred reaction mixture there was then added 500 ml. of water. The resultant oil and aqueous layers were extracted with ether. The combined ether extracts were washed with 5% aqueous sodium hydroxide solution to remove unreacted phenol and were then dried over anhydrous sodium sulfate. After stripping off ether in a vacuum oven, the product was distilled under reduced pressure; boiling point, 167° C. at 3.5 mm., $n_D^{24}$:[3] 1.595. The yield was 27.4 g. or 76% of theoretical. This material gave a negative ferric chloride test indicating the absence of unreacted phenol and that etherification had occurred. Infrared analysis showed the presence of allyl absorption band at 910 cm.$^{-1}$ and 993 cm.$^{-1}$ and non-bonded carbonyl group absorption at 1650 cm.$^{-1}$. The chemical analysis was as follows: carbon, 79.26%; hydrogen 5.72% (calculated for $C_{16}H_{14}O_2$; carbon 80.64%; hydrogen 5.92%). The product, therefore, was O-allyloxybenzophenone.

A quantity of the ether (16.6 g.) was heated to 240° C. under nitrogen in a reflux apparatus. A sudden temperature surge to 290° C. occurred and heating was discontinued. The product distilled at 200–202° C. at 10 mm.; $n_D^{23}$: 1.633; yield—15.1 g. or 91% of theoretical. The product gave a positive test with ferric chloride, indicating that rearrangement of the O-allyloxybenzophenone to 3-allyl-2-hydroxybenzopenone had occurred. Infrared analysis showed the presence of allyl absorption at 910 cm.$^{-1}$ and 993 cm.$^{-1}$ and chelated carbonyl absorption at 1680 cm.$^{-1}$. The chemical analysis was: carbon 79.70%; hydrogen 5.92% (calculated for $C_{16}H_{14}O_2$: carbon, 80.64%; hydrogen, 5.92%). The product was 3-allyl-2-hydroxybenzophenone.

To 1.0 liter of stirred anhydrous chlorobenzene under nitrogen there was added 0.4 ml. (4 mmoles) of vanadyl trichloride and 12 ml. (12 mmoles) of 1 M aluminum triisobutyl (12 mmoles). To this catalyst system there was added simultaneously at room temperature ethylene at the rate of 175 cc./min. and a solution of 3-allyl-2-hydroxybenzophenone (7.3 g. diluted in 100 ml. with chlorobenzene) at the rate of 0.5 ml./min. The reaction was carried out for 2.5 hours. The product was then treated successively in an Osterizer with (a) 5% concentrated hydrochloric acid in methanol, (b) 2,4-pentanedione, (c) 50% methanol in water and (d) methanol.

---

[1] W. M. D. Bryant and R. C. Voter, Journal of American Chemical Society, 75, 6113 (1953). F. W. Billmeyer, "Textbook of Polymer Chemistry," Chapter 7, Interscience publishers 1957.

[2] Ferric chloride test described in article by Wesp and Brode, Journal of the American Chemical Society, 56, 1037 (1934).

[3] Refractive index determined using the D line of sodium at a temperature of 24° C.

Residual solvent was removed by heating in a vacuum oven at 100° C. Infrared analysis of the product after toluene extraction showed absorption bands at 1650, 1260, 1190, 1050 and 760 cm.$^{-1}$, which are characteristic of chelated carbonyl and aromatic groups. The indicated content of the substituted benzophenone in the polymer was about 0.2 mole percent. Repeated extraction of the product with toluene gave no change in the infrared scan, showing that a true copolymer had been produced.

A film was prepared by pressing a one square inch sample of this copolymer for one minute at a temperature of 120–175° C. under a pressure of about 30 tons. The resulting film was tested for ultraviolet light resistance. It remained flexible after 275 hours of exposure to a fluorescent sunlamp (2900 A.–3000 A.), whereas a control linear polyethylene film containing no stabilizer became embrittled at 25–35 hours.

*Example 2*

Into a reactor fitted with stirrer and reflux condenser, there were introduced 21.0 g. (0.15 mole) of 2-hydroxyacetophenone, 21.4 g. (0.178 mole) of allyl bromide and 21.4 g. (0.16 mole) of potassium carbonate. After thorough mixing of the reactants by efficient stirring and refluxing for a period of 8 hours, there was added 500 ml. of water. The contents of the reaction flask separated into an oil and an aqueous layer and these were extracted with ether. The combined ether extracts were washed with 5% aqueous sodium hydroxide solution to remove unreacted phenol and were then dried over anhydrous sodium sulfate. The ether was removed in a vacuum oven and the crude product was distilled. There was obtained 19.2 g. (73% of theoretical) of a water-white liquid, boiling at 105–108° C., at 1–2 mm., $n_D^{24}$: 1.539. The product showed a negative reaction on testing with ferric chloride. Its chemical analysis was: carbon, 74.59%; hydrogen, 6.94% (calculated for $C_{11}H_{22}O_2$: carbon, 74.97%; hydrogen, 6.86%). The product, therefore, was O-allyloxyacetophenone.

The ether was converted to the hydroacetophenone by a procedure similar to that described under Example 1 except that the temperature during reflux was not allowed to exceed 270° C. The product distilled at 96–98° C. at 3 mm., giving a nearly quantitative yield of a very light colored liquid, $n_D^{24}$: 1.554. The product gave a positive ferric chloride test. Its chemical analysis was: carbon, 74.71%; hydrogen, 6.93% (calculated for $C_{11}H_{12}O_2$: carbon, 74.97%; hydrogen, 6.86%). The product was 3-allyl-2-hydroxyacetophenone.

The 3-allyl-2-hydroxyacetophenone was copolymerized with ethylene using the same procedure as described in Example 1 except for the use of a solution of 3.0 g. of the acetophenone in 50 ml. hexane. Infrared analysis showed absorption characteristic of chelated carbonyl groups and that the product contained approximately 0.2 mole percent of 2-hydroxyacetophenone units. Additional evidence for copolymerization was that allyl infrared absorption was absent in the product and extraction with boiling chlorobenzene or toluene showed no composition change. A film pressed form this copolymer as in Example 1 showed resistance to ultraviolet light degradation similar to that of Example 1.

*Examples 3–4*

The following mixture was refluxed 6.0 hours: 20.0 g. (.09 mole) 4-methoxy-2-hydroxybenzophenone, 40 ml. acetone, 12.2 g. (.09 mole) potassium carbonate, 10.5 g. (.09 mole) allyl bromide. The product was isolated in the manner described in Example 1 but was rearranged at 240–300° C. without further purification. Fractionation of the rearranged material gave 14.0 g. (59% based on 4-methoxy-2-hydroxybenzophenone) of a light yellow oil, boiling point 200–201° C. (1 mm.), $n_D^{25}$: 1.6193, which showed a positive ferric chloride test. Its chemical analysis showed: carbon, 76.95%; hydrogen, 6.08% (calculated for $C_{17}H_{16}O_3$: carbon, 76.10%; hydrogen, 6.01%). An infrared scan on this material showed the presence of allyl groups at 910 cm.$^{-1}$ and 993 cm.$^{-1}$ and chelated ester group absorption at 1685 cm.$^{-1}$.

This copolymerization was carried out by introducing and maintaining ethylene up to a pressure of 1000 atmospheres in a pressure reactor containing 100 ml. of benzene, 2.0 g. of 4-methoxy-3-allyl-2-hydroxybenzophenone, 50 ml. water, 0.03 ml. di-tertiary butyl peroxide and maintained at 135–140° C. When a pressure drop was no longer observed, the reactor was opened and the product was removed. It was isolated and purified by washing three times with methanol in an Osterizer and drying in a vacuum oven at 100° C. The yield was 13.0 g. Inherent viscosity, measured at 0.1% solids in alpha-chloronaphthalene at 125° C., was 0.85. Strong aromatic bands at 750 to 800 cm.$^{-1}$, 1250 cm.$^{-1}$ and 1600 cm.$^{-1}$ and absence of allyl bands at 910 cm.$^{-1}$ and 993 cm.$^{-1}$ were observed using infrared scans indicating that copolymerization had occurred. The material was dissolved in boiling toluene and precipitated with methanol three times; no change in the infrared scans was observed. Calculations based on the infrared scan showed the presence of 0.1–0.2 mole percent of the 4-methoxy-2-hydroxybenzophenone compound in the copolymers. A 3 mil film pressed from this copolymer remained flexible after 1000 hours exposure under a fluorescent sunlamp whereas a film pressed from a commercial polyethylene resin, "Alathon" 20 [4], was embrittled after 275 hours. Another control film made from "Alathon" 20 containing physically incorporated therein approximately 1% by weight of 4-methoxy-2-hydroxybenzophenone showed no advantage over the similar control to which no stabilizer had been added.

For Example 4, the copolymerization of ethylene and 4-methoxy-3-allyl-2-hydroxybenzophenone was carried out in the presence of 0.2 gram of azo-dicyclohexane carbonitrile as the catalyst. In all other respects, the procedure was identical to Example 3. A yield of 35 grams of copolymer was obtained which contained 0.21 mole percent of combined 4-methoxy-2-hydroxybenzophenone. A film thereof provided test results similar to those for Example 3.

*Example 5*

The following mixture was heated at reflux for 24 hours:

| | |
|---|---|
| Methyl salicylate | 55.7 g. (0.037 mole). |
| Allyl bromide | 55.5 g. (0.46 mole). |
| Potassium carbonate | 50 g. (0.36 mole). |
| Water | 20 g. |

The reactor was cooled to room temperature and 100 ml. of water was added with stirring. Using a separatory funnel, the upper organic phase was separated. This phase was washed three times with 50 ml. of water and then distilled. The fraction distilling at 97° C. at 0.7 mm., $n_D^{26}$: 1.5296 was collected. The yield was 48.4 grams or 70% of theoretical. Infrared analysis showed allyl unsaturation bands at 910 cm.$^{-1}$ and 993 cm.$^{-1}$. Infrared analysis also showed that ester absorption above 1700 cm.$^{-1}$ was stronger than observed for methyl salicylate indicating that the hydroxyl group adjacent to the carbonyl group of the ester had been etherified. The material gave a negative ferric chloride test. Its chemical analysis was: carbon, 68.13%; hydrogen, 6.23% (calculated for $C_{11}H_{12}O_3$: carbon, 68.73%; hydrogen, 6.29%). The product was methyl 2-allyloxybenzoate.

Under a nitrogen atmosphere, 42 g. of the methyl 2-allyloxybenzoate was heated to reflux temperature (approximately 267° C.) for 15 minutes, after which it was distilled. A single fraction was obtained at 95–96° C. and 1 mm. pressure; $n_D^{25}$: 1.5392. Infrared analysis showed allyl absorption at 910 cm.$^{-1}$ and 993 cm.$^{-1}$; ester absorption at 1690 cm.$^{-1}$ similar to that of methyl

---

[4] A polyethylene resin manufactured by E. I. du Pont de Nemours and Company.

salicylate indicating that the carbonyl was chelated with the adjacent hydroxyl group liberated in the rearrangement. The product gave a positive ferric chloride test. Its chemical analysis was: carbon, 68.35%; hydrogen, 6.32% (calculated for $C_{11}H_{12}O_3$; carbon, 68.73%; hydrogen, 6.29%). The product was methyl 3-allyl salicylate.

Copolymerization with ethylene was carried out using essentially the same procedure as that described in Example 3 except that 0.4 ml. of methyl 3-allyl salicylate was used instead of the benzophenone as the comonomer. After purification the yield of copolymer was 13.2 g.; inherent viscosity, measured at 0.1% solids in alpha-chloronaphthalene at 125° C., was 0.38. Infrared analysis on a pressed film showed the presence of strong aromatic absorption at 750 cm.$^{-1}$ and chelated carbonyl absorption from the ester group at 1690 cm.$^{-1}$. Calculation showed the presence of 0.23 mole percent of salicylate groups. True copolymerization was indicated by the unchanged infrared scan after repeated solution and reprecipitation of the product, by the presence of the chelated carbonyl absorption band and by the absence of the allyl group absorption band. A film pressed from this copolymer was flexible after 600 hours exposure to a fluorescent sun lamp whereas a film pressed from "Alathon" 20 was brittle after 275 hours. A similar control film pressed from "Alathon" 20 and containing approximately 0.5% by weight initially of methyl 3-allyl-salicylate physically incorporated therein showed no advantage over a similar control to which no stabilizer was added.

*Example 6*

The methyl-3-allyl-salicylate prepared as in Example 5 was copolymerized with ethylene at atmospheric pressure using essentially the procedure described in Example 1 except for the use of chlorobenzene as solvent in a solution of 1 ml. of the methyl 3-allyl-salicylate diluted to 50 ml. The dried product weighed 15 grams; inherent viscosity, measured at 0.1% solids in alpha-chloronaphthalene at 125° C., was 3.54. Infrared analysis on a pressed film showed strong aromatic absorption at 750 cm.$^{-1}$, chelated carbonyl absorption of the ester group at 1690 cm.$^{-1}$ and no allyl absorption at 910 cm.$^{-1}$. Calculations show the presence of 0.23 mole percent of salicylate groups. Partial extraction with toluene in chlorobenzene overnight in a Soxhlet apparatus showed no change in the infrared absorption. A film pressed from this copolymer was flexible after 275 hours exposure to a fluorescent sun lamp whereas control linear polyethylene films without any stabilizer or with 0.5% by weight of the salicylate physically incorporated in the film were embrittled after 35 hours exposure.

*Example 7*

Under anhydrous conditions 1.0 liter of normal hexane containing 0.5 ml. (5 mmoles) vanadyl trichloride and 15 ml. of 1 M aluminum triisobutyl (15 mmoles) initially protected by a blanket of nitrogen, was treated simultaneously with (a) an ethylene stream, 175 cc./min., (b) a butene-1 stream, 8 cc./min. and (c) a solution of 2 ml. of methyl 3-allyl-salicylate diluted to 100 ml. with normal hexane, 0.5 ml./min. The methyl 3-allyl-salicylate had been prepared as in Example 5. The copolymerization reaction was carried out for 2.5 hours. After purification and drying according to the method described in Example 1, 13.0 g. of product was obtained; inherent viscosity, measured at 0.1% solids in alpha-chloronaphthalene at 125° C., was 5.15. Copolymerization had occurred as shown by strong aromatic infrared bands at 750 cm.$^{-1}$, the absence of 910 cm.$^{-1}$ allyl absorption, the failure of the infrared absorption to change after repeated cycles of dissolving in toluene, and the precipitation of the product with methanol. A film pressed from this copolymer was flexible after 275 hours exposure to a fluorescent sun lamp whereas a control linear polyethylene film was brittle after 30 hours exposure.

Having fully described the invention, what is claimed is:

1. A weather-resistant shaped structure which comprises a copolymer of 90–99.99 mole percent of at least one aliphatic alpha-olefin having the structural formula:

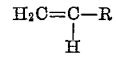

wherein R is selected from the group consisting of hydrogen and alkyl having 1–4 carbon atoms, with .01–10 mole percent of at least one allyl compound selected from the group consisting of

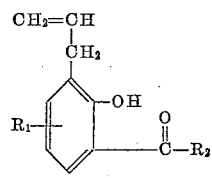

and

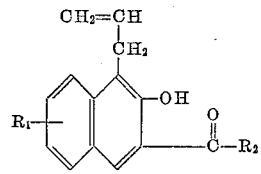

wherein $R_1$ is selected from the group consisting of hydrogen, halogen, alkyl, alkoxy, carboalkoxy, and acyl, and $R_2$ is selected from the group consisting of alkyl, alkoxy and

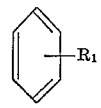

2. A weather-resistant self-supporting film which comprises a copolymer of 90–99.99 mole percent of at least one aliphatic alpha-olefin having the structural formula:

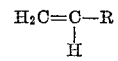

wherein R is selected from the group consisting of hydrogen and alkyl having 1–4 carbon atoms, with .01–10 mole percent of at least one allyl compound selected from the group consisting of

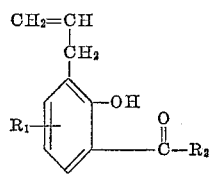

and

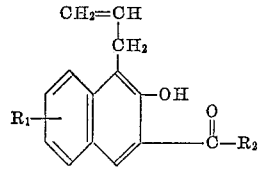

wherein $R_1$ is selected from the group consisting of hydrogen, halogen, alkyl, alkoxy, carboalkoxy, and acyl, and $R_2$ is selected from the group consisting of alkyl, alkoxy and

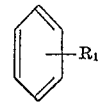

3. A copolymer of 90–99.99 mole percent of at least one aliphatic alpha-olefin having the structural formula:

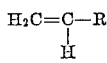

wherein R is selected from the group consisting of hydrogen and alkyl having 1–4 carbon atoms, with .01–10 mole percent of at least one allyl compound selected from the group consisting of

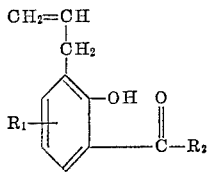

and

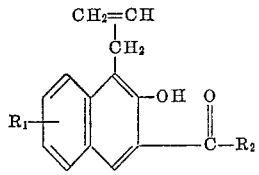

wherein $R_1$ is selected from the group consisting of hydrogen, halogen, alkyl, alkoxy, carboalkoxy, and acyl, and $R_2$ is selected from the group consisting of alkyl, alkoxy and

4. A copolymer as in claim 3 wherein at least one aliphatic alpha-olefin is ethylene.
5. A copolymer as in claim 3 wherein at least one aliphatic alpha-olefin is butene-1.
6. A copolymer as in claim 3 wherein at least one aliphatic alpha-olefin is propylene.
7. A copolymer as in claim 3 wherein at least one aliphatic alpha-olefin is pentene-1.
8. A copolymer as in claim 3 wherein at least one aliphatic alpha-olefin is hexene-1.
9. A copolymer as in claim 3 wherein at least one allyl compound is 3-allyl-2-hydroxybenzophenone.
10. A copolymer as in claim 3 wherein at least one allyl compound is 3-allyl-2-hydroxyacetophenone.
11. A copolymer as in claim 3 wherein at least one allyl compound is 4-methoxy-3-allyl-2-hydroxybenzophenone.
12. A copolymer as in claim 3 wherein at least one allyl compound is methyl 3-allyl-salicylate.
13. A process for preparing weather-resistant polymeric material which comprises copolymerizing at a temperature of −40° to 300° C. and a pressure of 1–1000 atmospheres 90–99.99 mole percent of at least one aliphatic alpha-olefin having the structural formula

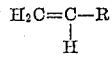

wherein R is selected from the group consisting of hydrogen and alkyl having 1–4 carbon atoms, with .01–10 mole percent of at least one allyl compound selected from the group consisting of

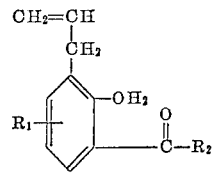

and

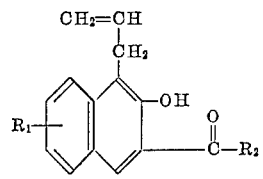

wherein $R_1$ is selected from the group consisting of hydrogen, halogen, alkyl, alkoxy, carboalkoxy, and acyl, and $R_2$ is selected from the group consisting of alkyl, alkoxy and

14. A process as in claim 13 wherein at least one aliphatic alpha-olefin is ethylene.
15. A process as in claim 13 wherein at least one allyl compound is 3-allyl-2-hydroxybenzophenone.
16. A process as in claim 13 wherein at least one allyl compound is 3-allyl-2-hydroxyacetophenone.
17. A process as in claim 13 wherein at least one allyl compound is 4-methoxy-3-allyl-2-hydroxybenzophenone.
18. A process as in claim 13 wherein at least one allyl compound is methyl 3-allyl-salicylate.
19. A weather-resistant polymeric composition comprising a copolymer of 90–99.99 mole percent of ethylene and .01–10 mole percent of 3-allyl-2-hydroxybenzophenone.
20. A process for preparing weather-resistant polymeric material which comprises copolymerizing at a temperature of −40° to 300° C. and a pressure of 1–1000 atmospheres 90–99.99 mole percent of ethylene with .01–10 mole percent of 3-allyl-2-hydroxybenzophenone.

References Cited in the file of this patent
UNITED STATES PATENTS
2,716,097    Unruh et al. _____ Aug. 23, 1955

UNITED STATES PATENT OFFICE
CERTIFICATE OF CORRECTION

Patent No. 3,062,784                                    November 6, 1962

Stanley Tocker

It is hereby certified that error appears in the above numbered patent requiring correction and that the said Letters Patent should read as corrected below.

Column 5, lines 55 to 61, the formula should appear as shown below instead of as in the patent:

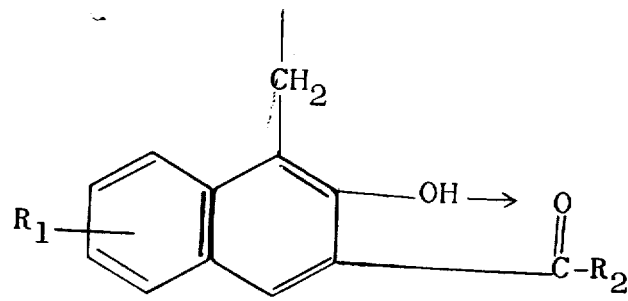

column 7, line 41, for "hydroacetophenone" read -- hydroxyacetophenone --; line 60, for "form" read -- from --; column 12, lines 10 to 17, the formula should appear as shown below instead of as in the patent:

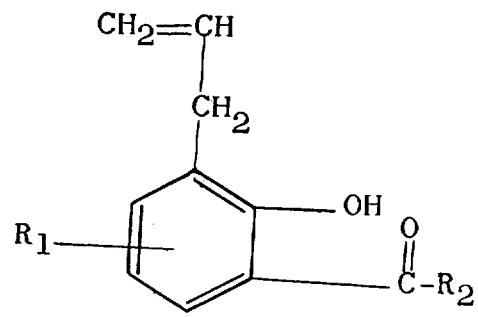

Signed and sealed this 20th day of August 1963.

(SEAL)
Attest:

ERNEST W. SWIDER                                   DAVID L. LADD
Attesting Officer                              Commissioner of Patents